United States Patent
Schmidt et al.

(10) Patent No.: US 12,333,406 B2
(45) Date of Patent: Jun. 17, 2025

(54) METHOD AND DEVICE FOR CLASSIFYING SENSOR DATA AND FOR ASCERTAINING AN ACTIVATION SIGNAL FOR ACTIVATING AN ACTUATOR

(71) Applicant: Robert Bosch GmbH, Stuttgart (DE)

(72) Inventors: Frank Schmidt, Leonberg (DE); Torsten Sachse, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1064 days.

(21) Appl. No.: 17/295,765

(22) PCT Filed: Nov. 28, 2019

(86) PCT No.: PCT/EP2019/082838
§ 371 (c)(1),
(2) Date: May 20, 2021

(87) PCT Pub. No.: WO2020/126379
PCT Pub. Date: Jun. 25, 2020

(65) Prior Publication Data
US 2022/0012560 A1    Jan. 13, 2022

(30) Foreign Application Priority Data

Dec. 19, 2018 (DE) .......................... 102018222346.7
Oct. 1, 2019 (DE) .......................... 102019215120.5

(51) Int. Cl.
*G06N 3/04* (2023.01)
*G06N 3/08* (2023.01)

(52) U.S. Cl.
CPC .............. *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 6,434,540 B1* | 8/2002 | Numaoka | G06N 20/00 706/23 |
| 2012/0290950 A1* | 11/2012 | Rapaport | H04L 12/1818 715/753 |

(Continued)

FOREIGN PATENT DOCUMENTS

| | | |
|---|---|---|
| CN | 107609634 A | 1/2018 |
| DE | 19653554 A1 | 6/1998 |
| WO | 2017048195 A1 | 3/2017 |

OTHER PUBLICATIONS

John Duchi et al., "Efficient Projections onto the $\ell$ 1-Ball for Learning in High Dimensions", Jul. 2008, Association for Computing, Machinery, pp. 272-279 (Year: 2008).*

(Continued)

*Primary Examiner* — Brian M Smith
(74) *Attorney, Agent, or Firm* — NORTON ROSE FULBRIGHT US LLP

(57) ABSTRACT

A method for providing an activation signal for activating an actuator. The activation signal is ascertained as a function of an output signal of a neural network. The neural network includes a scaling layer. The scaling layer maps an input signal present at the input of the scaling layer onto an output signal present at the output of the scaling layer in such a way that this mapping corresponds to a projection of the input signal onto a predefinable value range, parameters being predefinable, which characterize the mapping.

18 Claims, 16 Drawing Sheets

(56) References Cited

U.S. PATENT DOCUMENTS

| | | | |
|---|---|---|---|
| 2018/0349771 A1* | 12/2018 | Kamilov | G06N 3/084 |
| 2018/0356771 A1* | 12/2018 | Basu | G05B 13/04 |
| 2019/0180188 A1* | 6/2019 | Liang | G06N 3/086 |
| 2024/0370696 A2* | 11/2024 | Massingham | G06N 3/044 |

OTHER PUBLICATIONS

Songfeng Zheng, "Smoothly approximated support vector domain description", Sep. 2015 (Year: 2015).*

Elad Hoffer et al., "Norm matters: efficient and accurate normalization schemes in deep networks", Mar. 2018, p. 6 (Year: 2018).*

Cho, M. et al., "Riemannian approach to batch normalization," 31st Conf. on Neural Inform. Processing Systems (NIPS 2017) 11 pp. (Year: 3027).*

Bilen, H. et al., "Universal representations: the missing link between faces, text, planktons, and cat breeds," downloaded from <arxiv.org/abs/1701.07275> (Jan. 25, 2017) 10 pp. (Year: 2017).*

International Search Report for PCT/EP2019/082838, Issued Feb. 28, 2020.

Hoffer et al., "Norm Matters: Efficient and Accurate Normalization Schemes in Deep Networks," 32nd Conference on Neural Information Processing Systems (NEURIPS 2018), Cornell University Library, 2019, pp. 1-13, <https://arxiv.org/pdf/1803.01814.pdf> Downloaded May 19, 2021.

Lei Ba et al., "Layer Normalization," Cornell University Library, 2016, pp. 1-14. <https://arxiv.org/pdf/1607.06450.pdf> Downloaded May 19, 2021.

Arpit et al., "Normalization Propagation: A Parametric Technique for Removing Internal Covariate Shift in Deep Networks," Cornell University Library, 2016, pp. 1-11. <https://arxiv.org/pdf/1603.01431.pdf> Downloaded May 19, 2021.

You et al., "Large Batch Training of Convolutional Networks," Cornell University Library, 2017, pp. 1-8. <https://arxiv.org/pdf/1708.03888.pdf> Downloaded May 19, 2021.

Wang et al., "NormFace: L 2 Hypersphere Embedding for Face Verification," Cornell University Library, 2017, pp. 1-11, <https://arxiv.org/pdf/1704.06369.pdf> Downloaded May 19, 2021.

Ioffe et al., "Batch Normalization: Accelerating Deep Network Training by Reducing Internal Covariate Shift," Proceedings of Machine Learning Research (PMLR), Proceedings of the International Conference on Machine Learning (ICML 2015), vol. 37, 2015. pp. 1-9.

Hinton et al., "Improving Neural Networks by Preventing Co-Adaptation of Feature Detectors," Cornell University Library, 2012, pp. 1-36.

\* cited by examiner

METHOD AND DEVICE FOR CLASSIFYING SENSOR DATA AND FOR ASCERTAINING AN ACTIVATION SIGNAL FOR ACTIVATING AN ACTUATOR

FIELD

The present invention relates to a method for classifying input signals, a method for providing an activation signal, a computer program, a machine-readable memory medium, and an actuator control system.

BACKGROUND INFORMATION

The paper "Improving neural networks by preventing co-adaptation of feature detectors," arXiv preprint arXiv: 1207.0580v1, Geoffrey E. Hinton, Nitish Srivastava, Alex Krizhevsky, Ilya Sutskever, Ruslan R. Salakhutdinov (2012) describes a method for training neural networks, in which feature detectors are randomly omitted during the training. These methods are also known by the name "dropout."

The paper "Batch Normalization: Accelerating Deep Network Training by Reducing Internal Covariate Shift," arXiv preprint arXiv:1502.03167v3, Sergey Ioffe, Christian Szegedy (2015) describes a method for training neural networks, in which input variables into a layer are normalized for a mini-batch of training examples.

SUMMARY

A method in accordance with an example embodiment may have the advantage over the related art that an architecture search of the neural network is simplified.

Advantageous refinements of the present invention are disclosed herein.

SUMMARY

With the aid of a sufficiently large amount of training data, so-called "deep learning" methods, i.e., (deep) artificial neural networks may be utilized in order to efficiently ascertain a mapping between an input space $V_0$ and an output space $V_k$. This may be, for example, a classification of sensor data, in particular image data, i.e., a mapping from sensor data or image data onto classes. Basically, the approach is to provide a number k−1 of hidden spaces $V_1, \ldots, V_{k-1}$. Moreover, the number k of mappings $f^i : V_{i-1} \to V_i$ (i=1 … k between these spaces is provided. Each of these mappings $f^i$ is usually referred to as a layer. Such a layer $f^i$ is typically parameterized by weights $w_i \in W^i$ including a suitably selected space $W^i$. Weights $w_1, \ldots, w_k$ of the number k of layers $f^i$ are also referred to, summarized, as weights $w \in W := W^1 \times \ldots \times W^k$, and the mapping of input space $V_0$ onto output space $V_k$ is referred to as $f_w : V_0 \to V_k$, which results from individual mappings $f^i$ (with weights $w_i$ explicitly indicated as a subscript), is referred to as $f_w(x) := f_{w_k}^k \circ \ldots \circ f_{w_1}^1(x)$.

At a given probability distribution D, which is defined on $V_0 \times V_k$, the objective of the training of the neural network is to determine weights $w \in W$ in such a way that an expected value $\Phi$ of a cost or loss function L $$\Phi[w] = E_{(x_D, y_D) \sim D}[L(f_w(x_D), y_D)] \qquad (1)$$

is minimized. Cost or loss function L designates a measure for the distance between the mapping of an input variable $x_D$ onto a variable $V_k$ in output space $V_k$ ascertained with the aid of function $f_w$ and an actual output variable $y_D$ in output space $V_k$.

A "deep neural network" may be understood to be a neural network including at least two hidden layers.

In order to minimize this expected value $\Phi$, gradient-based methods may be utilized, which ascertain a gradient $\nabla \Phi$ with respect to the weights w. This gradient $\nabla \Phi$ (is usually approximated with the aid of training data $(x_j, y_j)$, i.e., by $\nabla_w L(f_w(x_j, y_j))$, indices j being selected from a so-called epoch. Here, an epoch is a permutation of labels $\{1, \ldots, N\}$ of the available training data points.

In order to expand the training data set, so-called data augmentation (also referred to as augmentation) may be utilized. Here, instead of pair $(x_j, y_j)$, an augmented pair $(x_a, y_j)$ may be selected for each index j from the epoch, input signal $x_j$ being replaced by an augmented input variable $x_a \in \alpha(x_j)$. Here, $\alpha(x_j)$ may be a set of typical variations of input signal $x_j$ (including input signal $x_j$ itself), which leave a classification of input signal $x_j$, i.e., the output signal of the neural network, unchanged.

This epoch-based sampling is not completely consistent with the definition from equation (1), however, since each data point is selected exactly one time in the course of an epoch. The definition from equation (1), however, is based on independently drawn data points. That is, while equation (1) presumes a drawing of the data points "with replacement," epoch-based sampling carries out a drawing of the data points "without replacement." This may result in the preconditions of mathematical proofs not being met (this is the case because, if N examples are drawn from a set having the number N of data points, the probability of drawing each of these data points exactly once is less than $e^{-N/2}$ (for N>2), while this probability is always equal to 1 in epoch-based sampling.

If data augmentation is utilized, this statistical effect may be further amplified, since an element of set $\alpha(x_j)$ is present in each epoch and, depending on augmentation function $\alpha$, it may not be ruled out that $\alpha(x_j) \approx \alpha(x_i)$ for i≠j. A statistically correct mapping of the augmentations with the aid of set $\alpha(x_j)$ is difficult here, since the effect does not need to be uniformly pronounced for each input datum $x_j$. In this way, for example, a rotation may have no effect on circular objects, but may have a very strong effect on general objects. Therefore, the size of set $\alpha(x_j)$ may be dependent upon input datum $x_j$, which may be problematic for adversarial training methods.

Finally, the number N of training data points is a variable, which is generally difficult to establish. If N is selected to be too large, the run time of the training method may be unduly extended; if N is selected to be too small, a convergence may not be guaranteed, since mathematical proofs of the convergence are usually based on assumptions, which are then not met. In addition, it is unclear at which point in time the training is to be reliably terminated. If a portion of the data points is utilized as an evaluation data set and the quality of the convergence is determined with the aid of this evaluation data set, this may result, with respect to the data points of the evaluation data set, in an over-fitting of weights w, which not only reduces the data efficiency, but may also worsen the performance of the network when it is applied on data other than the training data. This may result in a reduction of the so-called generalizability.

In order to reduce an over-fitting, a piece of information stored in the hidden layers may be randomly thinned out with the aid of the dropout method mentioned at the outset.

In order to improve the randomization of the training process, due to the use of so-called batch normalization layers, statistical parameters μ and σ may be introduced via so-called mini-batches, which are updated with respect to probability during the training process. In the inference, the values of these parameters μ and σ are selected as fixedly predefinable values, for example, as estimated values from the training via extrapolation of the exponential decay behavior.

If the layer having index i is a batch normalization layer, associated weights $w_i=(\mu_i,\sigma_i)$ are not updated in a gradient descent, i.e., these weights $w_i$ are therefore handled differently than weights $w_k$ of remaining layers k. This increases the complexity of an implementation.

In addition, the size of the mini-batch is a parameter, which usually affects the training result and, therefore, must be set as well as possible as a further hyperparameter, for example, within the scope of a (possibly complex) architecture search.

In a first aspect of the present invention, it is therefore provided that the neural network includes a scaling layer, the scaling layer mapping an input signal present at the input of the scaling layer onto an output signal present at the output of the scaling layer in such a way that this mapping corresponds to a projection of the input signal onto a predefinable value range, parameters being predefinable, which characterize the mapping. The value range may be defined by a norm. If this is the case, the scaling layer ensures that the scale of the input signal is limited with respect to this norm.

"Predefinable" may mean, in this context, in particular, that these parameters are adaptable during a training of the neural network as a function of a gradient, this gradient being ascertained in a usual way as a function of an output signal of the neural network and an associated desired output signal.

This means, initially in a training phase, the predefinable parameters are adapted as a function of a method for training the neural network, an adaptation of these predefinable parameters taking place during the training as a function of the output signal of the neural network when the input signal of the neural network is supplied and as a function of the associated desired output signal, the adaptation of the predefinable parameters taking place as a function of an ascertained gradient, which is dependent on the output signal of the neural network and the associated desired output signal.

Preferably, it may be provided in refinements of the present invention that the scaling layer maps an input signal present at the input of the scaling layer onto an output signal present at the output of the scaling layer in such a way that this mapping corresponds to a projection onto a ball, center c and/or radius ρ of this ball being fixedly predefinable.

Here, the mapping may be established by the equation $y=\mathrm{argmin}_{N_1(y-c)\le\rho}N_2(x-y)$ including a first norm $N_1$ and a second norm $N_2$. The term "norm" is to be understood here in a mathematical sense.

In a particularly efficiently calculated refinement, it may be provided that first norm $N_1$ and second norm $N_2$ are selected to be identical.

Alternatively or additionally, first norm $N_1$ may be an $L^\infty$ norm. This norm may also be particularly efficiently calculated, in particular also for the case in which first norm $N_1$ and second norm $N_2$ are not selected to be identical.

Alternatively, it may be provided that first norm $N_1$ is an $L^1$ norm. This selection of the first norm supports the sparsity of the output signal of the scaling layer. This is advantageous, for example, for the compression of neural networks, since weights having the value 0 do not make a contribution to the output value of its layer.

Therefore, a neural network including such a layer may be utilized in a particularly memory-efficient manner, in particular, in connection with a compression method.

In the above-described variants for first norm $N_1$, it may be advantageously provided that second norm $N_2$ is an $L^2$ norm. Therefore, the methods may be particularly easily implemented.

In accordance with an example embodiment of the present invention, it is particularly advantageous here when the equation $y=\mathrm{argmin}_{N_1(y-c)\le\rho}N_2(x-y)$ is solved with the aid of a deterministic Newton method.

Namely, it was surprisingly found that this method is particularly efficient when the input signal is present at the input of the scaling layer along with several important, i.e., strongly weighted, features.

Specific embodiments of the present invention are explained in greater detail below with reference to the figures.

DETAILED DESCRIPTION OF EXAMPLE EMBODIMENTS

Figure 1:
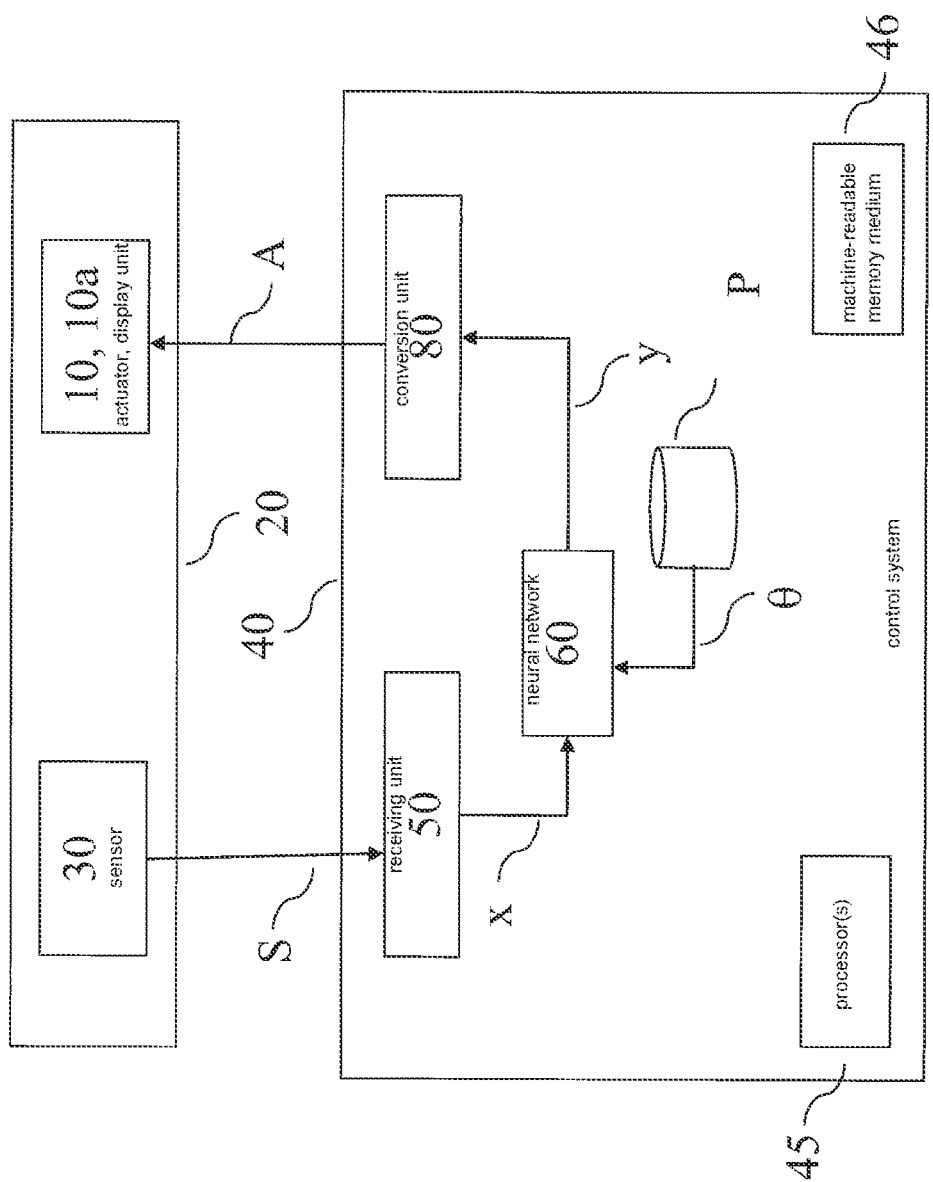
FIG. 1 schematically shows a configuration of a specific embodiment of a control system, in accordance with the present invention.

FIG. 1 shows an actuator 10 in its surroundings 20 in interaction with a control system 40. Actuator 10 and surroundings 20 are referred to jointly as an actuator system. At preferably regular time intervals, a state of the actuator system is detected with the aid of a sensor 30, which may also be in the form of a plurality of sensors. Sensor signal S—or, in the case of multiple sensors, one sensor signal S in each case—of sensor 30 is transmitted to control system 40. Control system 40 therefore receives a series of sensor signals S. On the basis thereof, control system 40 ascertains activation signals A, which are transferred to actuator 10.

Sensor 30 is an arbitrary sensor, which detects a state of surroundings 20 and transmits this as sensor signal S. It may be, for example, an imaging sensor, in particular an optical sensor, such as an image sensor or a video sensor, or a radar sensor, or an ultrasonic sensor, or a LIDAR sensor. It may also be an acoustic sensor, which receives, for example, structure-borne noise or voice signals. The sensor may also be a position sensor (such as, for example, GPS) or a kinematic sensor (for example, a single- or multi-axis acceleration sensor). A sensor, which characterizes an orientation of actuator 10 in surroundings 20 (for example, a compass), is also possible. A sensor, which detects a chemical composition of surroundings 20, for example, a lambda sensor, is also possible. Alternatively or additionally, sensor 30 may also encompass an information system, which ascertains a piece of information regarding a state of the actuator system, such as, for example, a weather information system, which ascertains a present or future condition of the weather in surroundings 20.

Control system 40 receives the series of sensor signals S of sensor 30 in an optional receiving unit 50, which converts the series of sensor signals S into a series of input signals x (alternatively, particular sensor signal S may also be directly adopted as input signal x). Input signal x may be, for example, a section or a further processing of sensor signal S. Input signal x may encompass, for example, image data or images, or individual frames of a video recording. In other words, input signal x is ascertained as a function of sensor signal S. Input signal x is routed to a neural network 60.

Neural network 60 is preferably parameterized by parameters θ, for example, including weights w, which are stored in a parameter memory P and, by this, are made available.

Neural network 60 ascertains output signals y from input signals x. Typically, output signals y encode a piece of classification information of input signal x. Output signals y are routed to an optional conversion unit 80, which, on the basis of output signals y, ascertains activation signals A, which are routed to actuator 10, in order to appropriately activate actuator 10.

Actuator 10 receives activation signals A, is appropriately activated and carries out an appropriate action. Actuator 10 may encompass an (not necessarily structurally integrated) activation logic, which ascertains a second activation signal from activation signal A, with the aid of which actuator 10 is then activated.

In further specific embodiments, control system 40 includes sensor 30. In even further specific embodiments, alternatively or additionally, control system 40 also includes actuator 10.

In further preferred specific embodiments, control system 40 includes one or a plurality of processor(s) 45 and at least one machine-readable memory medium 46, on which instructions are stored, which, for the case in which they are run on processors 45, prompt control system 40 to carry out the method for operating control system 40.

In alternative specific embodiments, a display unit 10*a* is provided alternatively or additionally to actuator 10.

Figure 2:
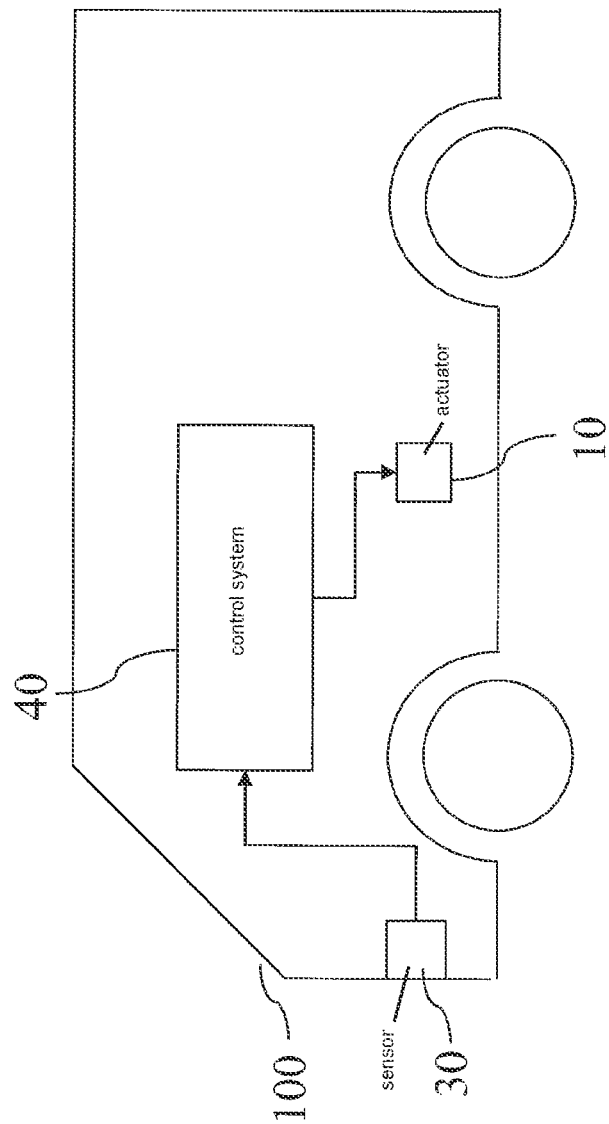
FIG. 2 schematically shows an exemplary embodiment for the control of an at least semi-autonomous robot, in accordance with the present invention.

FIG. 2 shows an exemplary embodiment, in which control system 40 is utilized for controlling an at least semi-autonomous robot, in this case an at least semi-automated motor vehicle 100.

Sensor 30 may be one of the sensors mentioned in conjunction with FIG. 1, preferably one or multiple video sensor(s) and/or one or multiple radar sensor(s) and/or one or multiple ultrasonic sensor(s) and/or one or multiple LIDAR sensor(s) and/or one or multiple position sensor(s) (for example, GPS) preferably situated in motor vehicle 100.

Neural network 60 may detect, out of input data x, for example, objects in the surroundings of the at least semi-autonomous robot. Output signal y may be a piece of information, which characterizes where objects are present in the surroundings of the at least semi-autonomous robot. Output signal A may then be ascertained as a function of this piece of information and/or in accordance with this piece of information.

Actuator 10 preferably situated in motor vehicle 100 may be, for example, a brake, a drive, or a steering of motor vehicle 100. Activation signal A may then be ascertained in such a way that actuator or actuators 10 is/are activated in such a way that motor vehicle 100, for example, prevents a collision with the objects identified by neural network 60, in particular when these are objects of certain classes, for example, pedestrians. In other words, activation signal A may be ascertained as a function of the ascertained class and/or in accordance with the ascertained class.

Alternatively, the at least semi-autonomous robot may also be another mobile robot (not represented), for example, such a robot, which moves by flying, swimming, diving, or walking. The mobile robot may also be, for example, an at least semi-autonomous lawn mower or an at least semi-autonomous cleaning robot, or the like. In these cases as well, activation signal A may be ascertained in such a way that the drive and/or the steering of the mobile robot are/is activated in such a way that the at least semi-autonomous robot, for example, prevents a collision with the objects identified by neural network 60.

In one further alternative, the at least semi-autonomous robot may also be a garden robot (not represented), which ascertains a type or a condition of plants in surroundings 20 with the aid of an imaging sensor 30 and neural network 60. Actuator 10 may then be, for example, a chemical applicator. Activation signal A may be ascertained as a function of the ascertained type or of the ascertained condition of the plants in such a way that an amount of the chemicals is applied in accordance with the ascertained type or the ascertained condition.

In even further alternatives, the at least semi-autonomous robot may also be a household appliance (not represented), in particular, a washing machine, a stove, an oven, a microwave, or a dishwasher. With the aid of sensor 30, for example, an optical sensor, a condition of an object handled by the household appliance, for example, in the case of the washing machine, a condition of laundry located in the washing machine, may be detected. With the aid of neural network 60, a type or a condition of this object may then be ascertained and characterized by output signal y. Activation signal A may then be ascertained in such a way that the household appliance is activated as a function of the ascertained type or the ascertained condition of the object. For example, in the case of the washing machine, the washing machine may be activated as a function of the material of which the laundry located therein is made. Activation signal A may then be selected as a function of the ascertained material of which the laundry is made.

Figure 3:
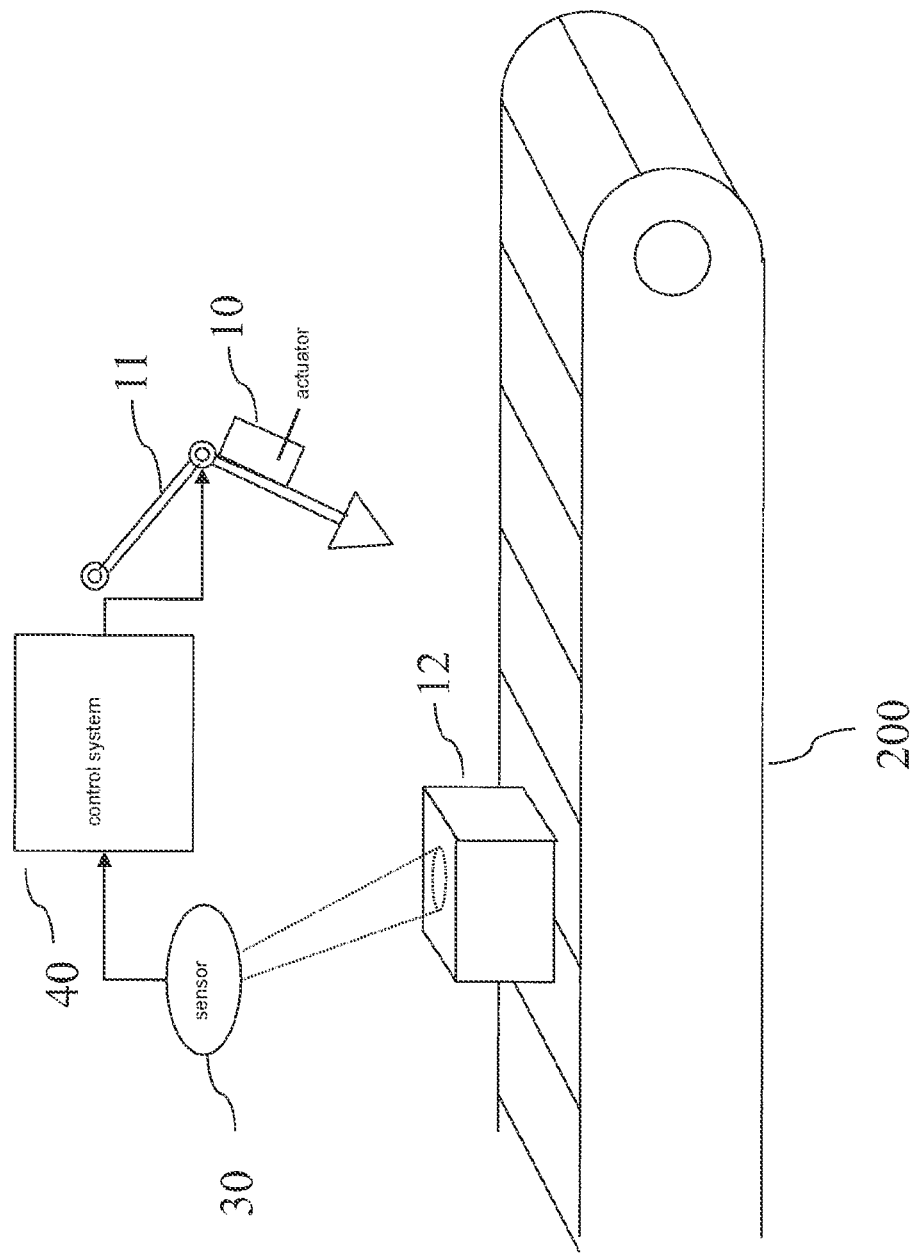
FIG. 3 schematically shows an exemplary embodiment for the control of a production system, in accordance with the present invention.

FIG. 3 shows an exemplary embodiment, in which control system 40 is utilized for activating a production machine 11 of a production system 200, in that an actuator 10 controlling this production machine 11 is activated. Production machine 11 may be, for example, a machine for punching, sawing, drilling, and/or cutting.

Sensor 30 may be one of the sensors mentioned in conjunction with FIG. 1, preferably an optical sensor, which detects, for example, properties of manufactured products 12. It is possible that actuator 10 controlling production machine 11 is activated as a function of the ascertained properties of manufactured product 12, so that production machine 11 appropriately carries out a subsequent processing step of this manufactured product 12. It is also possible that sensor 30 ascertains the properties of manufactured product 12 processed by production machine 11 and, as a function thereof, adapts an activation of production machine 11 for a subsequent manufactured product.

Figure 4:
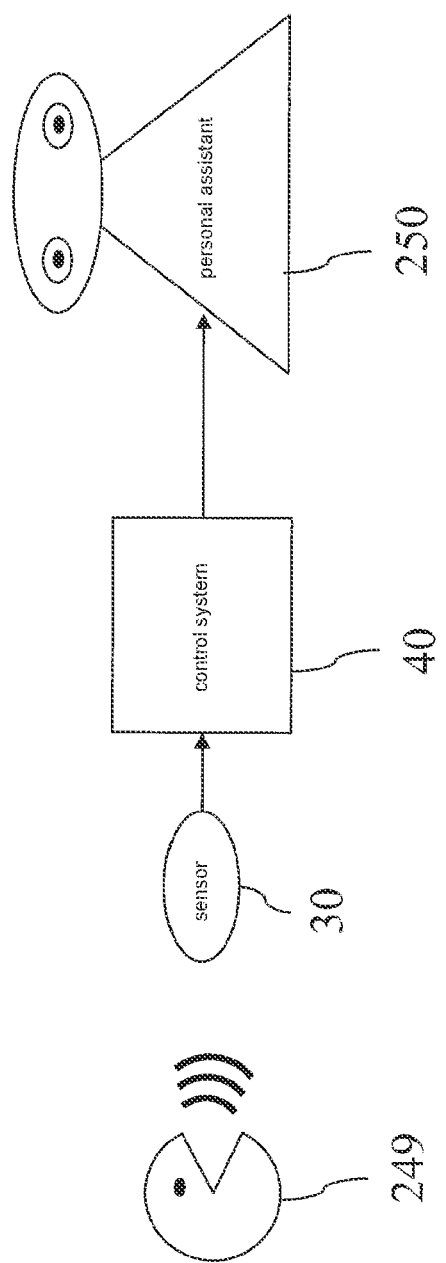
FIG. 4 schematically shows an exemplary embodiment for the control of a personal assistant, in accordance with the present invention.

FIG. 4 shows an exemplary embodiment, in which control system 40 is utilized for the control of a personal assistant 250. Sensor 30 may be one of the sensors mentioned in conjunction with FIG. 1. Sensor 30 is preferably an acoustic sensor, which receives voice signals of a user 249. Alternatively or additionally, sensor 30 may also be configured for receiving optical signals, for example, video images of a gesture of user 249.

As a function of the signals of sensor 30, control system 40 ascertains an activation signal A of personal assistant 250, for example, in that the neural network carries out a gesture recognition. This ascertained activation signal A is then transmitted to personal assistant 250 and, thereby, appropriately activates it. This ascertained activation signal A may be selected in such a way that it corresponds to an assumed desired activation by user 249. This assumed desired activation may be ascertained as a function of the gesture recognized by neural network 60. As a function of the assumed desired activation, control system 40 may then select activation signal A for transmission to personal assistant 250 and/or select activation signal A for transmission to the personal assistant in accordance with the assumed desired activation 250.

This appropriate activation may include, for example, that personal assistant 250 retrieves information from a database and plays it back for user 249 in a comprehensible manner.

Instead of personal assistant 250, a household appliance (not represented) may also be provided, in particular, a washing machine, a stove, an oven, a microwave, or a dishwasher, in order to be appropriately activated.

Figure 5:
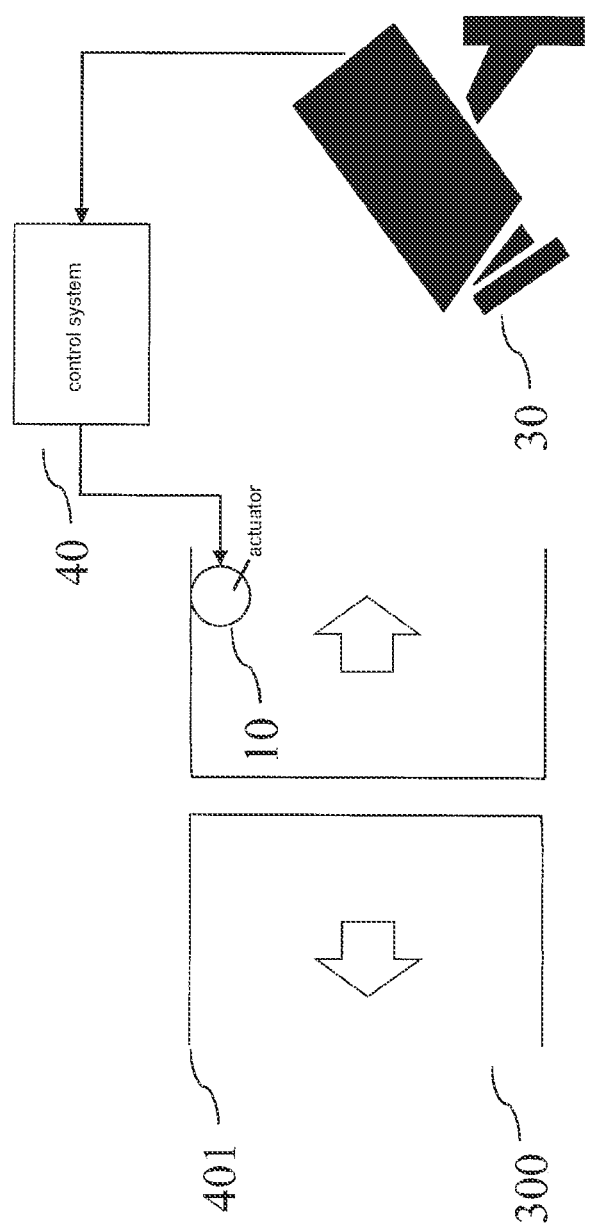
FIG. 5 schematically shows an exemplary embodiment for the control of an access system, in accordance with the present invention.

FIG. 5 shows an exemplary embodiment, in which control system 40 is utilized for the control of an access system 300. Access system 300 may encompass a physical access control, for example, a door 401. Sensor 30 may be one of the sensors mentioned in conjunction with FIG. 1, preferably an optical sensor (for example, for detecting image or video data), which is configured for recognizing a face. With the aid of neural network 60, this detected image may be interpreted. For example, the identity of a person may be ascertained. Actuator 10 may be a lock, which releases the access control, or not, for example, opens door 401, or not, as a function of activation signal A. For this purpose, activation signal A may be selected as a function of the interpretation of neural network 60, for example, as a function of the ascertained identity of the person. Instead of the physical access control, a logical access control may also be provided.

Figure 6:
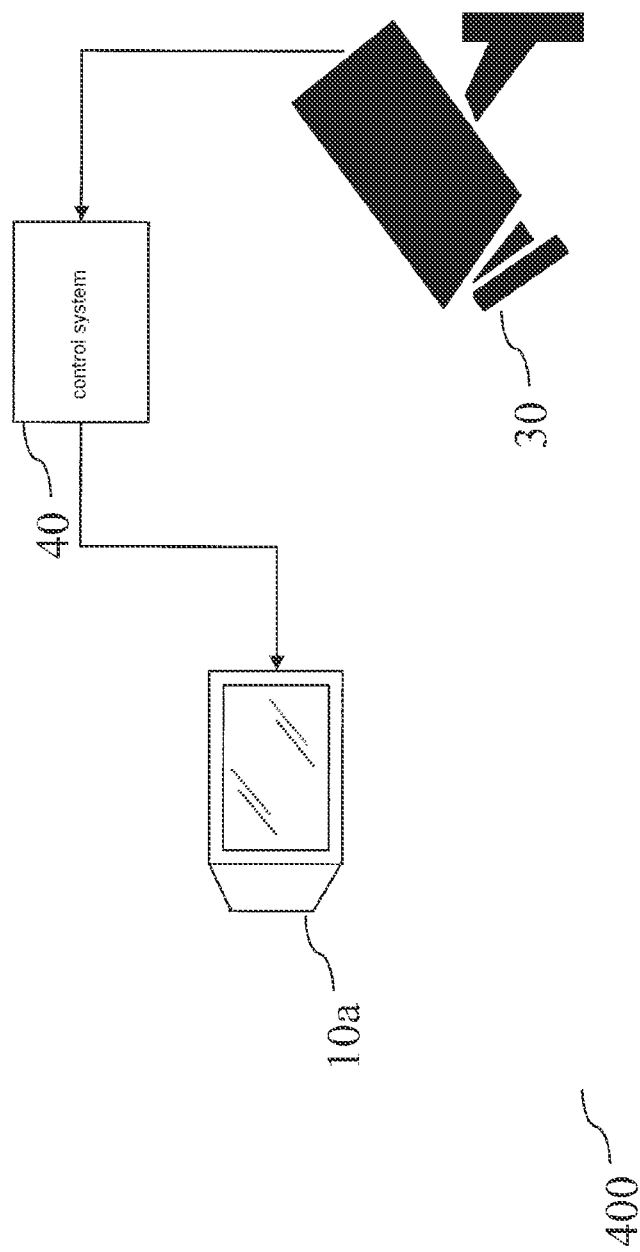
FIG. 6 schematically shows an exemplary embodiment for the control of a monitoring system, in accordance with the present invention.

FIG. 6 shows an exemplary embodiment, in which control system 40 is utilized for the control of a monitoring system 400. This exemplary embodiment differs from the exemplary embodiment represented in FIG. 5 in that, instead of actuator 10, display unit 10a is provided, which is activated by control system 40. For example, it may be ascertained by neural network 60 whether an object recorded by the optical sensor is suspicious, and activation signal A may then be selected in such a way that this object is represented by display unit 10a highlighted in color.

Figure 7:
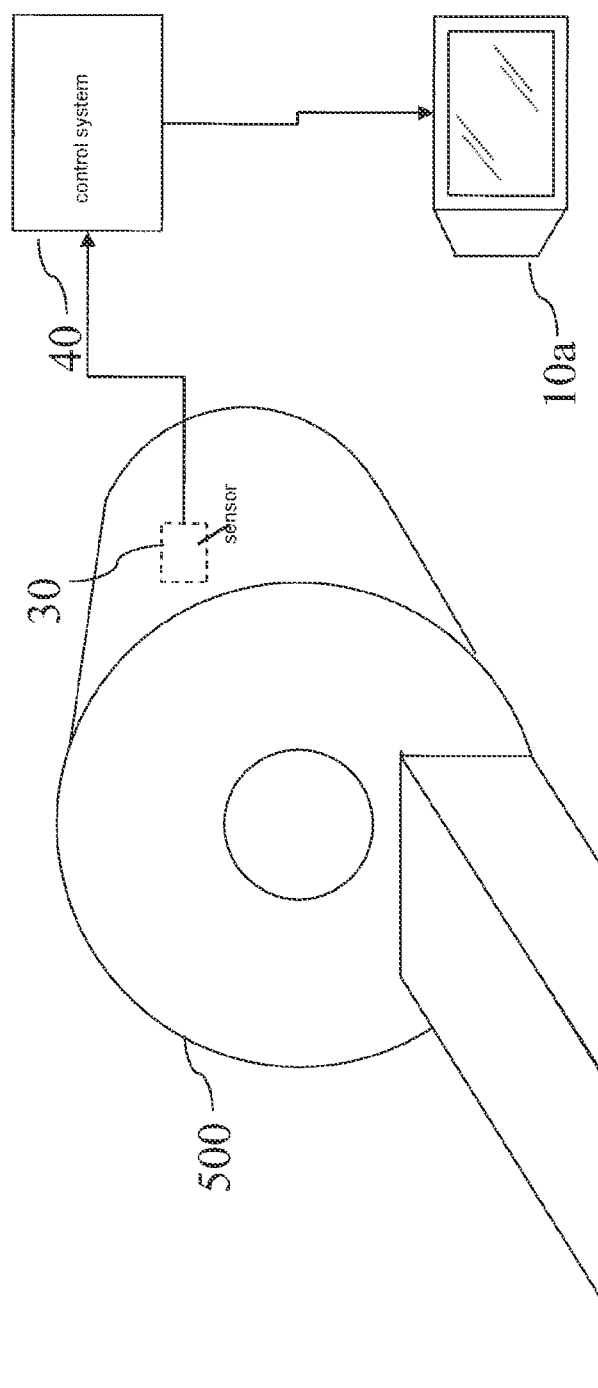
FIG. 7 schematically shows an exemplary embodiment for the control of a medical imaging system, in accordance with the present invention.

FIG. 7 shows an exemplary embodiment, in which control system 40 is utilized for the control of a medical imaging system 500, for example, an MRT, X-ray, or ultrasonic device. Sensor 30 may be in the form, for example, of an imaging sensor; display unit 10a is activated with the aid of control system 40. For example, it may be ascertained by neural network 60 whether an area recorded by the imaging sensor is conspicuous, and activation signal A may then be selected in such a way that this area is represented by display unit 10a highlighted in color.

Figure 8:
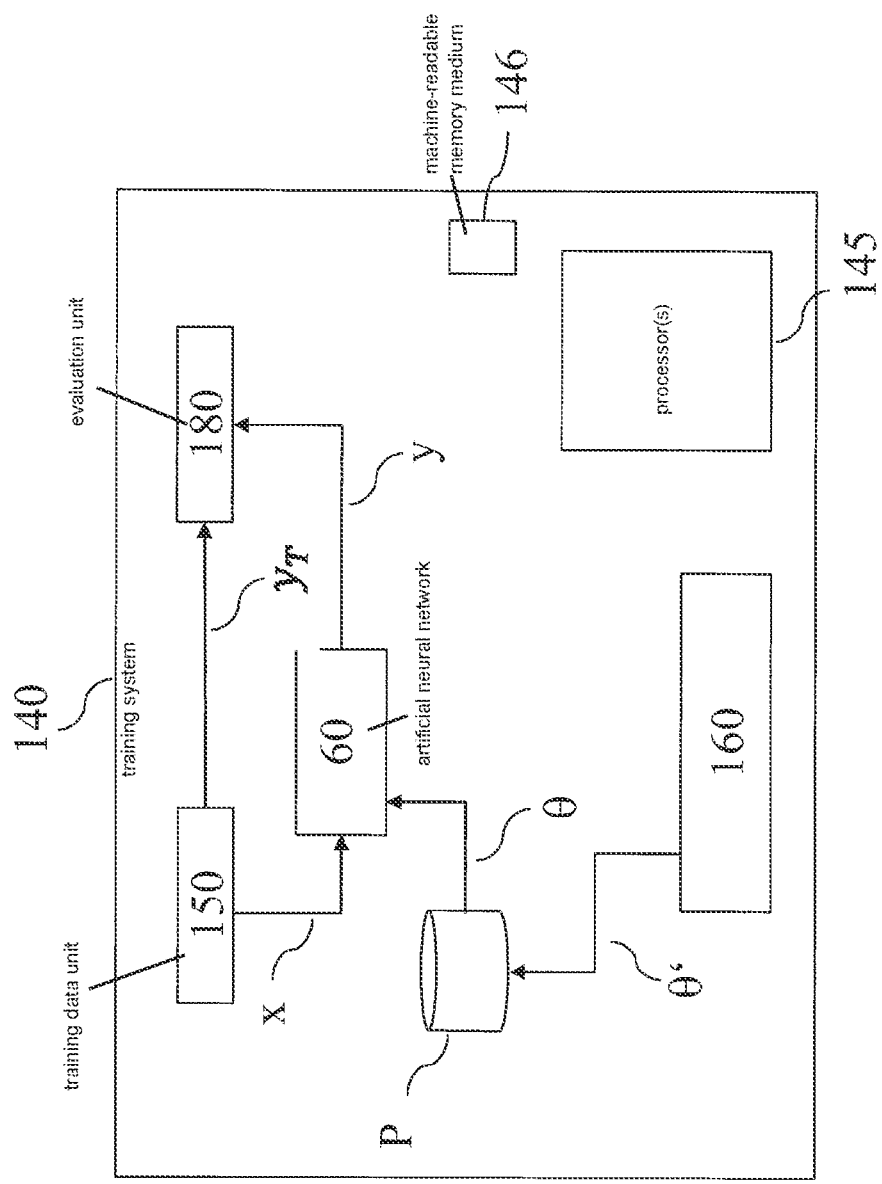
FIG. 8 schematically shows a training system, in accordance with the present invention.

FIG. 8 schematically shows an exemplary embodiment of a training system 140 for training neural network 60 with the aid of a training method. A training data unit 150 ascertains suitable input signals x, which are routed to neural network 60. For example, training data unit 150 accesses a computer-implemented database, in which a set of training data is stored, and selects, for example, input signals x randomly from the set of training data. Optionally, training data unit 150 also ascertains desired or "actual" output signals $y_T$ assigned to input signals x, which are routed to an evaluation unit 180.

Artificial neural network 60 is configured for ascertaining associated output signals y from input signals x routed thereto. These output signals y are routed to evaluation unit 180.

Evaluation unit 180 may characterize a performance of neural network 60, for example, with the aid of a cost or loss function L dependent on output signals y and desired output signals $y_T$. Parameters θ may be optimized as a function of cost or loss function L.

In further preferred specific embodiments, training system 140 includes one or a plurality of processor(s) 145 and at least one machine-readable memory medium 146, on which instructions are stored, which, for the case in which they are run on processors 145, prompt control system 140 to carry out the training method.

Figure 9:
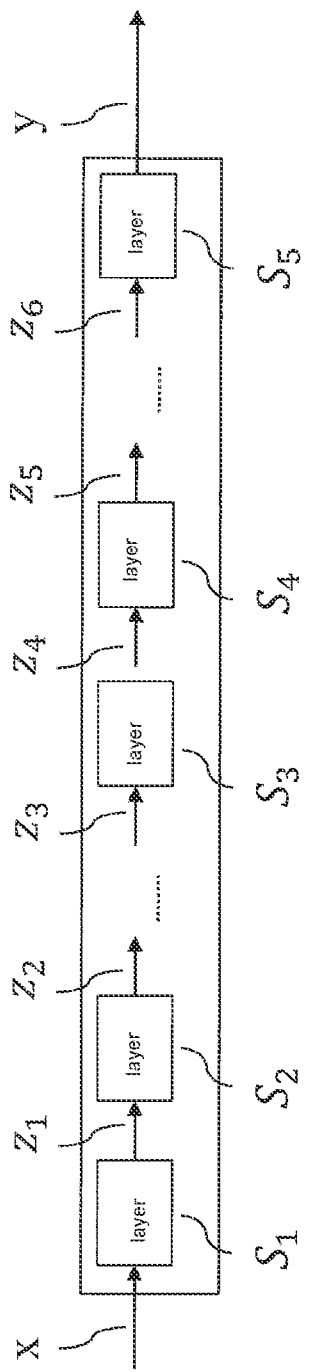
FIG. 9 schematically shows a configuration of a neural network, in accordance with the present invention.

FIG. 9 shows, by way of example, one possible configuration of neural network 60, which prevails as a neural network in the exemplary embodiment. The neural network encompasses a plurality of layers $S_1, S_2, S_3, S_4, S_5$, in order to ascertain, from input signal x, which is supplied at an input of an input layer $S_1$, output signal y, which is present at an output of an output layer $S_5$. Each of the layers $S_1, S_2, S_3, S_4, S_5$ is configured for ascertaining, from a (possibly multi-dimensional) input signal x, $z_1, z_3, z_4, z_6$, which is present at an input of particular layer $S_1, S_2, S_3, S_4, S_5$, a (possibly multi-dimensional) output signal $z_1, z_2, z_4, z_5, y$, which is present at an output of particular layer $S_1, S_2, S_3, S_4, S_5$. Such output signals are also referred to as feature maps, specifically in image processing. Here, it is not necessary for layers $S_1, S_2, S_3, S_4, S_5$ to be situated in such a way that all output signals, which are incorporated into further layers as input signals, are incorporated into a layer directly following a particular preceding layer. Instead, skip connections or recurrent connections are also possible. It is also possible, of course, that input signal x is incorporated into several of the layers, or that output signal y of neural network 60 is made up of output signals of a plurality of layers.

Output layer $S_5$ may be in the form, for example, of an argmax layer (i.e., a layer, which selects, from a plurality of inputs including particular assigned input values, an identifier of the input, whose assigned input value is the largest of all these input values); one or multiple of the layers $S_1, S_2, S_3$ may be in the form, for example, of a convolution layer or convolution layers.

Figure 15:
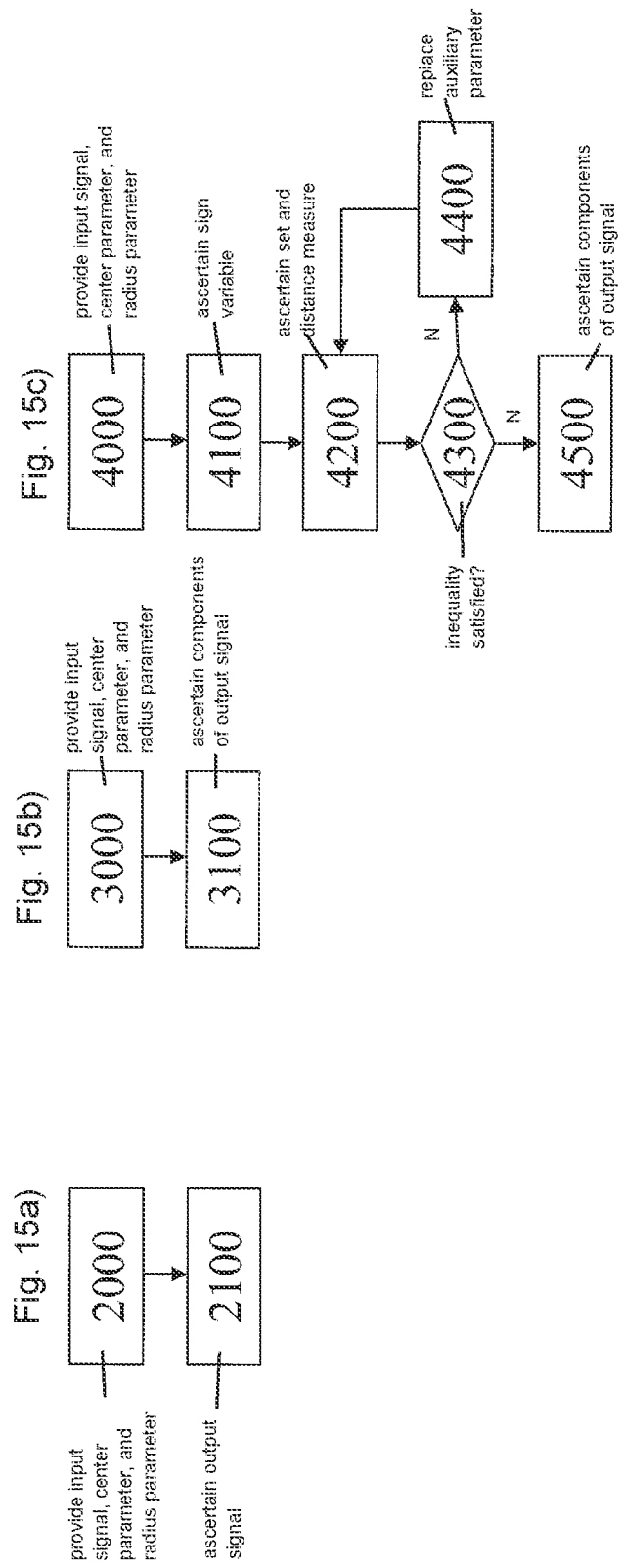
FIGS. 15a)-15c) shows specific embodiments for the implementation of a scaling layer within the neural network in flowcharts, in accordance with the present invention.

Advantageously, one layer $S_4$ is designed as a scaling layer, which is designed in such a way that an input signal x present at the input of scaling layer $S_4$ is mapped onto an output signal y present at the output of scaling layer $S_4$ in such a way that output signal y present at the output is a rescaling of input signal x, parameters being fixedly predefinable, which characterize the rescaling. Exemplary embodiments of methods, which may implement scaling layer $S_4$, are described below in conjunction with FIG. 15.

Figure 10:
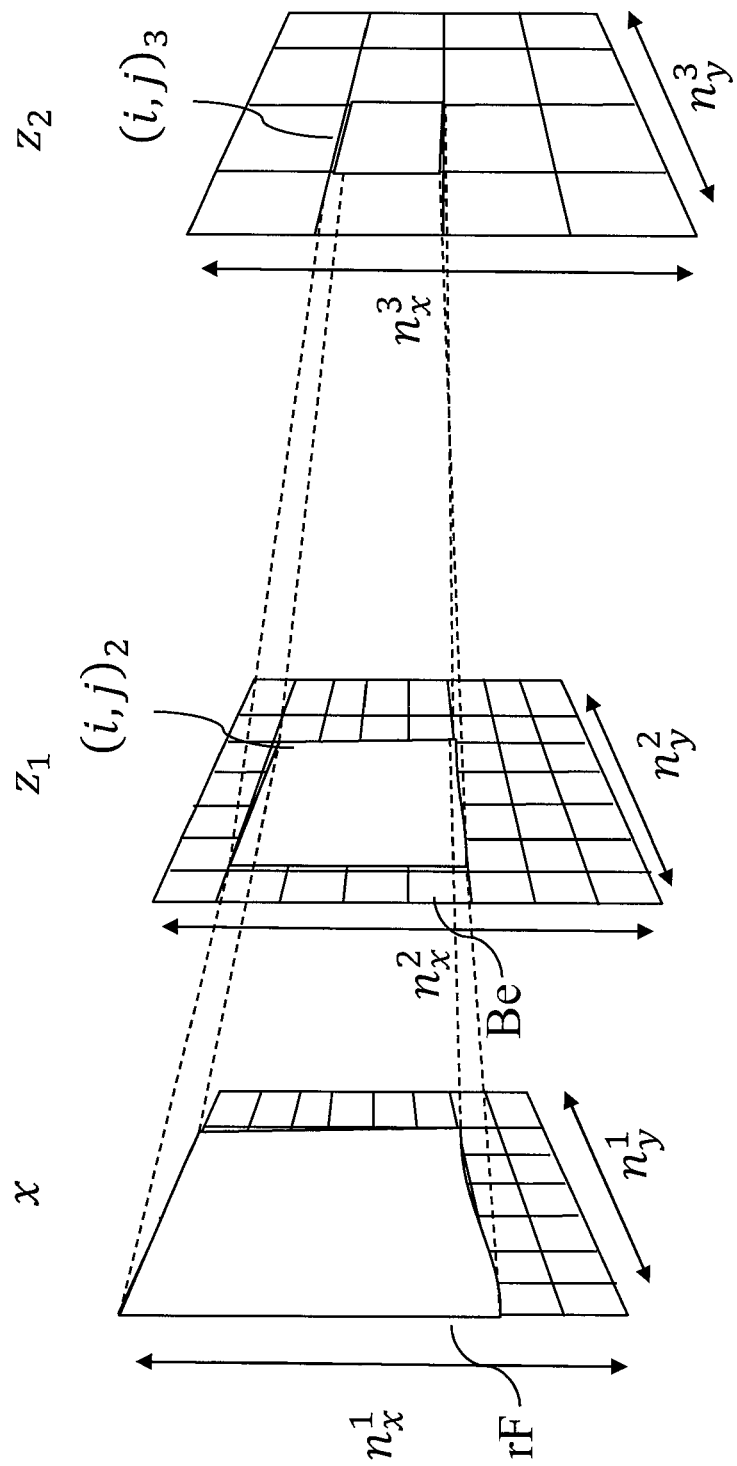
FIG. 10 schematically shows an information forwarding within the neural network, in accordance with the present invention.

FIG. 10 schematically illustrates the Information forwarding within neural network 60. Here, three multi-dimensional signals within neural network 60 are schematically represented, namely input signal x, and subsequent feature maps $z_1, z_2$. Input signal x has, in the exemplary embodiment, a spatial resolution of $n_x^1 \times n_y^1$ pixels, first feature map $z_1$ a resolution of $n_x^2 \times n_y^2$ pixels, and second feature map $z_2$ a resolution of $n_x^3 \times n_y^3$ pixels. In the exemplary embodiment, the resolution of second feature map $z_2$ is lower than the resolution of input signal x, although this is not absolutely necessarily the case.

Moreover, a feature, for example, a pixel, $(i,j)_3$ of second feature map $z_2$ is represented. If the function, which ascertains second feature map $z_2$ from first feature map $z_1$, is represented, for example, by a convolution layer or a fully connected layer, it is also possible that a plurality of features of first feature map $z_1$ is incorporated into the ascertainment of the value of this feature $(i,j)_3$. It is also possible, of course, that only a single feature of first feature map $z_1$ is incorporated into the ascertainment of the value of this feature $(i,j)_3$.

Here, "incorporate into" may be advantageously understood to mean that there is a combination of values of the parameters, which characterize the function, with the aid of which second feature map $z_2$ $z_2$ is ascertained from first feature map $z_1$, and of values of first feature map $z_1$ such that the value of feature $(i,j)_3$ is a function of the value of the feature being incorporated. The entirety of these features being incorporated is designated as area Be in FIG. 10.

A single feature or multiple features of input signal x is/are incorporated into the ascertainment of each feature $(i,j)_2$ of area Be itself. The set of all features of input signal x, which are incorporated into the ascertainment of at least one of the features $(i,j)_2$ of area Be, is referred to as receptive field rF of feature $(i,j)_3$. In other words, receptive field rF of feature $(i,j)_3$ encompasses all the features of input signal x, which are directly or indirectly (in other words: at least indirectly) incorporated into the ascertainment of feature $(i,j)_3$, i.e., the values of which may affect the value of feature $(i,j)_3$.

Figure 11:
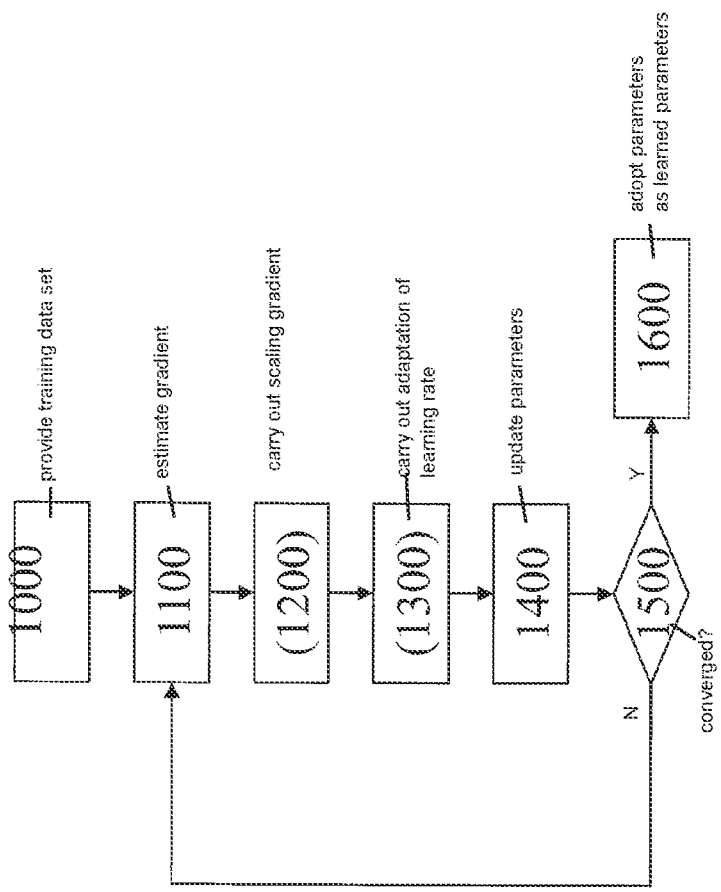
FIG. 11 shows a specific embodiment of a training method in a flowchart, in accordance with the present invention.

FIG. 11 shows, in a flowchart, the sequence of a method for training neural network 60 according to one specific embodiment.

Initially 1000, a training data set X including pairs $(x_i, y_i)$ of input signals $x_i$ and particular associated output signals $y_i$ is provided. A learning rate η is initialized, for example, η=1.

Figure 12:
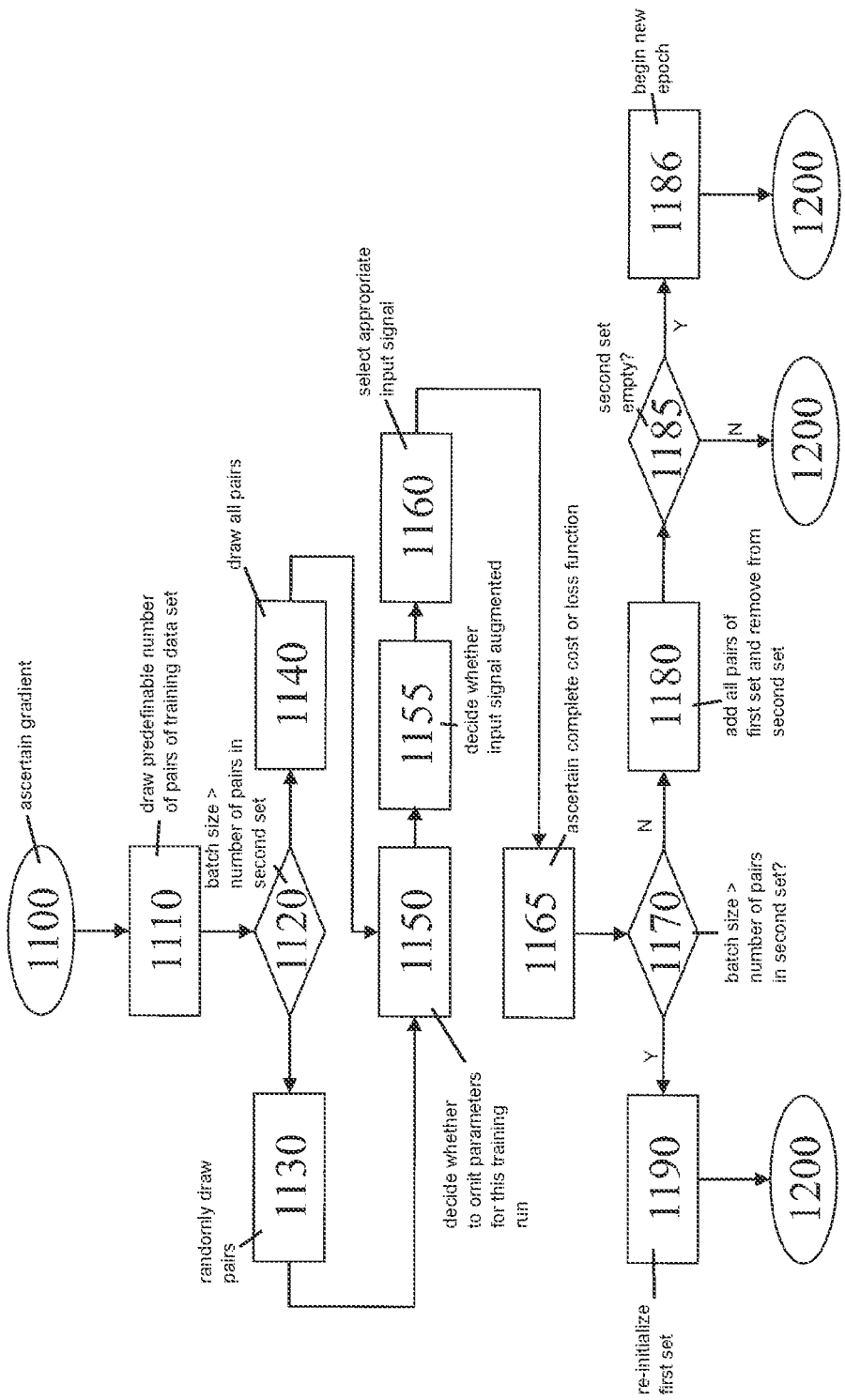
FIG. 12 shows a specific embodiment of a method for estimating a gradient in a flowchart, in accordance with the present invention.

Moreover, optionally, a first set G and a second set N are initialized, for example, when the exemplary embodiment, illustrated in FIG. 12, of this portion of the method is utilized in step 1100. If the exemplary embodiment, illustrated in FIG. 13, of this portion of the method is to be utilized in step 1100, the initialization of first set G and of second set N may be dispensed with.

The initialization of first set G and of second set N may take place as follows: First set G, which includes the pairs $(x_i, y_i)$ of training data set X, which were already drawn in the course of a present epoch of the training method, is initialized as an empty set. Second set N, which includes the pairs $(x_i, y_i)$ of training data set X, which were not yet drawn in the course of the present epoch, is initialized, in that all pairs $(x_i, y_i)$ of training data set X are assigned thereto.

Now 1100, with the aid of pairs $(x_i, y_i)$ of input signals $x_i$ and particular associated output signals $y_i$ of training data set X, a gradient g of characteristic L is estimated with respect to parameters θ, i.e., $g = \nabla_\theta L$. Exemplary embodiments of this method are described in conjunction with FIGS. 12 and 13.

Thereafter 1200, optionally, a scaling of gradient g is carried out. Exemplary embodiments of this method are described in conjunction with FIG. 14.

Thereafter 1300, optionally, an adaptation of a learning rate η is carried out. Here, learning rate η may be reduced, for example, by a predefinable learning rate reduction factor Dη (for example, Dη=1/10) (i.e., η←η·Dη), provided a number of the epochs passed through is divisible by a predefinable number of epochs, for example, 5.

Thereafter 1400, parameters θ are updated with the aid of ascertained and, possibly, scaled gradient g and learning rate η. For example, parameters θ are replaced by θ−η·g.

A check is now 1500 carried out with the aid of a predefinable convergence criterion, to determine whether the method has converged. For example, it may be decided, as a function of an absolute change of the parameters θ (for example, between the last two epochs), whether the convergence criterion has been met, or not. For example, the convergence criterion may be met precisely for the case in which an $L^2$ norm regarding the change of all parameters θ between the last two epochs is less than a predefinable convergence threshold.

If it was decided that the convergence criterion has been met, the parameters θ are adopted as learned parameters (step 1600), and the method ends. If not, the method jumps back to step 1100.

FIG. 12 illustrates, in a flowchart, an exemplary method for ascertaining gradient g in step 1100.

Initially 1110, a predefinable number bs of pairs $(x_i, y_i)$ of training data set X is to be drawn (without replacement), i.e., selected, and assigned to a batch B. Predefinable number bs is also referred to as batch size. Batch B is initialized as an empty set.

For this purpose, a check is carried out 1120 to determine whether batch size bs is greater than the number of pairs $(x_i, y_i)$, which are present in second set N.

If batch size bs is not greater than the number of pairs $(x_i, y_i)$, which are present in second set N, the number bs of pairs $(x_i, y_i)$ is randomly drawn 1130 from second set N, i.e., selected and added to batch B.

If batch size bs is greater than the number of pairs $(x_i, y_i)$, which are present in second set N, all pairs of second set N, whose number is designated as s, are drawn 1140, i.e., selected and added to batch B, and the remaining, i.e., the number bs−s, are drawn from first set G, i.e., selected and added to batch B.

Thereafter 1150, for all parameters θ, it is optionally decided at step 1130 or 1140, whether these parameters θ are to be omitted in this training run, or not. For this purpose, a probability is established, for example, separately for each layer ($S_1, S_2, \ldots, S_6$), with which parameters θ of this layer are omitted. For example, this probability may be 50% for first layer $S_1$ and reduced by 10% in each subsequent layer.

With the aid of these established particular probabilities, it may be decided for each of the parameters θ, whether it is omitted, or not.

For each pair ($x_i, y_i$) of batch B, it is now 1155 optionally decided whether particular input signal $x_i$ is augmented, or not. For every appropriate input signal $x_i$, which is to be augmented, an augmentation function is preferably randomly selected and applied to input signal $x_i$. Input signal $x_i$ augmented in this manner then replaces original input signal $x_i$. If input signal $x_i$ is an image signal, the augmentation function may be established, for example, via a rotation by a predefinable angle.

Thereafter 1160, for each pair ($x_i, y_i$) of batch B, appropriate (and, possibly, augmented) input signal $x_i$ is selected and routed to neural network 60. Parameters θ of neural network 60 to be omitted are deactivated during the ascertainment of the appropriate output signal, for example, in that they are temporarily set to the value zero. Appropriate output signal $y(x_i)$ of neural network 60 is assigned to appropriate pair ($x_i, y_i$). A cost or loss function $L_i$ is ascertained in each case as a function of output signals $y(x_i)$ and particular output signals $y_i$ of pair ($x_i, y_i$) as a desired output signal $y_T$.

Thereafter 1165, complete cost or loss function $\mathcal{L} = \Sigma_{i \in B} \mathcal{L}_i$ is ascertained jointly for all pairs ($x_i, y_i$) of batch B and the appropriate component of gradient g is ascertained, for example, with the aid of backpropagation, for each of parameters θ not to be omitted. The appropriate component of gradient g is set to zero for each of the parameters θ to be omitted.

Now, a check is carried out 1170 to determine whether it was established during the check in step 1000 that batch size bs is greater than the number of pairs ($x_i, y_i$), which are present in second set N.

If it was established that batch size bs is not greater than the number of pairs ($x_i, y_i$), which are present in second set N, all pairs ($x_i, y_i$) of batch B of first set G are 1180 added and removed from second set N. A check is now carried out 1185 to determine whether second set N is empty. If second set N is empty, a new epoch 1186 begins. For this purpose, first set G is initialized again as an empty set, and second set N is re-initialized, in that all pairs ($x_i, y_i$) of training data set X are assigned thereto again, and the method branches off to step 1200. If second set N is not empty, the method branches directly to step 1200.

If it was established that batch size bs is greater than the number of pairs ($x_i, y_i$), which are present in second set N, first set G is re-initialized 1190, in that all pairs ($x_i, y_i$) of batch B are assigned thereto, second set N is re-initialized, in that all pairs ($x_i, y_i$) of training data set X are assigned thereto again and, thereafter, pairs ($x_i, y_i$), which are also present in batch B, are removed. Thereafter, a new epoch begins and the method branches off to step 1200. Thus ends this portion of the method.

Figure 13:
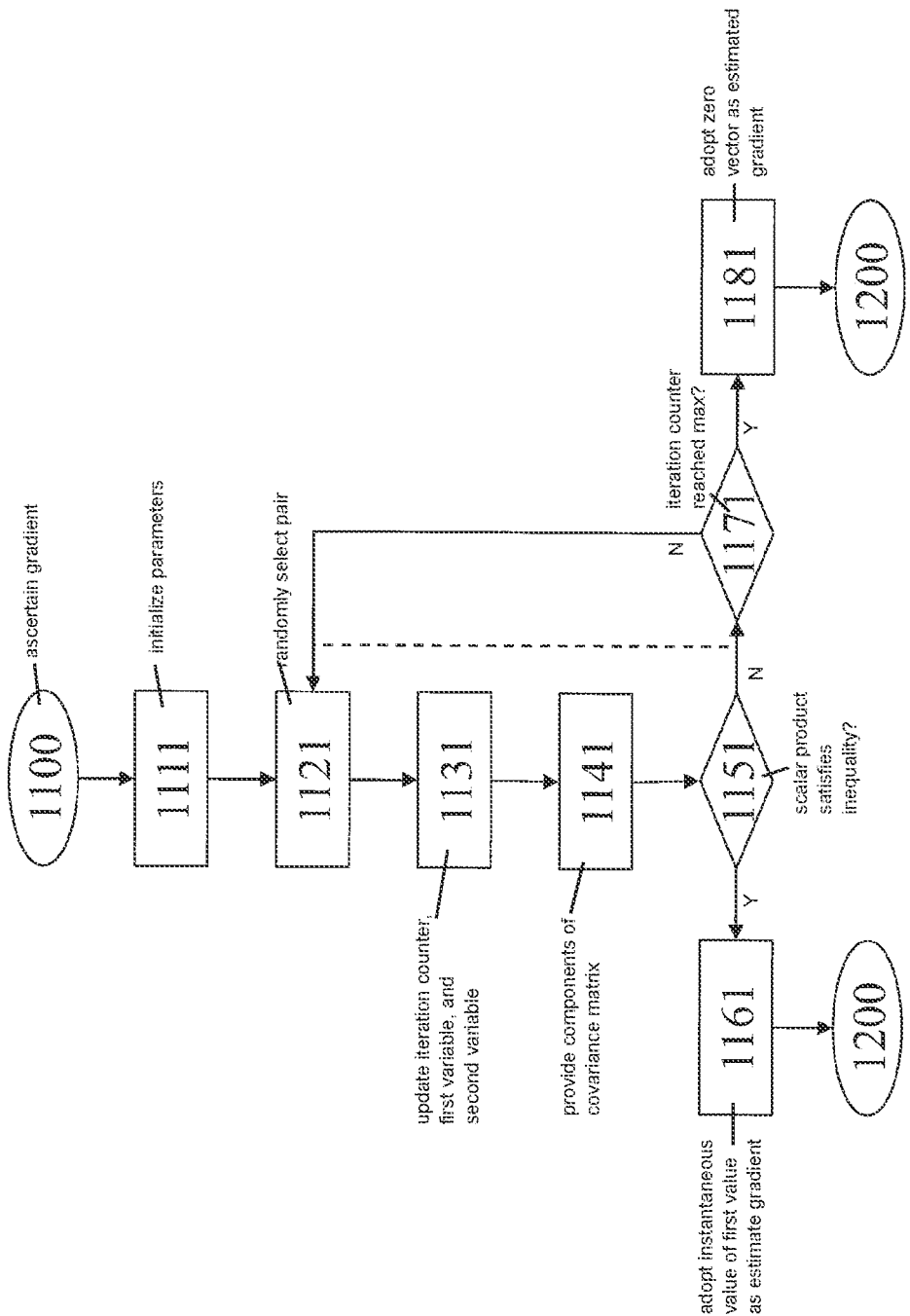
FIG. 13 shows an alternative specific embodiment of the method for estimating the gradient in a flowchart, in accordance with the present invention.

FIG. 13 illustrates, in a flowchart, one further exemplary method for ascertaining gradient g in step 1100. Initially, parameters of the method are initialized 1111. In the following, the mathematical space of parameters θ is designated as W. If parameters θ therefore encompass a number np of individual parameters, space W is an np-dimensional space, for example, $W = \mathbb{R}^{np}$. An iteration counter n is initialized to value n=0, a first variable $m_1$ is then set as $m_1 = 0 \in W$ (i.e., as an np-dimensional vector), a second variable $m_2$ is set as $m_2 = 0 \in W \otimes W$ (i.e., as an np×np-dimensional matrix).

Thereafter 1121, a pair ($x_i, y_i$) is randomly selected from training data set X and, possibly, augmented. This may take place, for example, in such a way that, for each input signal $x_i$ of pairs ($x_i, y_i$) of training data set X, a number $\mu(\alpha(x_i))$ of possible augmentations $\alpha(x_i)$ is ascertained and a position variable $$p_i = \frac{\sum_{j<i} pj}{\sum_j pj} \qquad (2)$$

is assigned to each pair ($x_i, y_i$) If a random number $\varphi \in [0; 1]$ is drawn in an evenly distributed manner, the position variable $p_i$ may be selected, which satisfies the string of inequalities $$p_i \leq \varphi < p_{i+1} \qquad (3)$$

Associated index i then designates selected pair ($x_i, y_i$), an augmentation $\alpha_i$ of input variable $x_i$ may be randomly drawn from the set of possible augmentations $\alpha(x_i)$ and applied to input variable $x_i$, i.e., selected pair ($x_i, y_i$) is replaced by ($\alpha_i(x_i), y_i$).

Input signal $x_i$ is routed to neural network 60. Appropriate cost or loss function $L_i$ is ascertained as a function of appropriate output signal $y(x_i)$ and output signal $y_T$ of pair ($x_i, y_i$) as a desired output signal $y_T$. For parameters θ, a relevant gradient d is ascertained, for example, with the aid of back propagation, i.e., $d = \nabla_\theta L(y(x_i), y_i)$.

Thereafter 1131, iteration counter n, first variable $m_1$, and second variable $m_2$ are updated as follows:

$$n \leftarrow n + 1 \qquad (4)$$

$$t = \frac{1}{n}$$

$$m_1 = (1-t) \cdot m_1 + t \cdot d \qquad (5)$$

$$m_2 = (1-t) \cdot m_2 + t \cdot (d \cdot d^T) \qquad (6)$$

Thereafter 1141, components $C_{a,b}$ of a covariance matrix C are provided as $$C_{ab} = \frac{1}{n}(m_2 - m_1 \cdot m_1^T)_{ab}. \qquad (7)$$

On the basis thereof, with the aid of the (vector-valued) first variable $m_1$, a scalar product S is formed, i.e., $$S = \langle m_1, C^{-1} m_1 \rangle. \qquad (8)$$

It is understood that not all entries of covariance matrix C or inverses $C^{-1}$ need to be present simultaneously for the sufficiently precise ascertainment of scalar product S with the aid of equation (8). It is more memory-efficient to determine entries $C_{a,b}$ of covariance matrix C, which are then necessary, during the evaluation of equation (8).

A check is then carried out 1151 to determine whether this scalar product S satisfies the following inequality:

$$S \geq \lambda^2, \qquad (9)$$

in which λ is a predefinable threshold value, which corresponds to a confidence level.

If the inequality is satisfied, the instantaneous value of first variable $m_1$ is adopted as estimated gradient g (step 1161) and the method branches back to step 1200.

If the inequality is not satisfied, the method may branch back to step 1121. Alternatively, a check can also be carried out 1171 to determine whether iteration counter n has reached a predefinable maximum iteration value $n_{max}$. If this is not the case, the method branches back to step 1121, otherwise zero vector $0 \in W$ is adopted 1181 as estimated gradient g and the method branches back to step 1200. Thus ends this portion of the method.

Due to this method, $m_1$ corresponds to an arithmetic mean of ascertained gradients d across drawn pairs $(x_i, y_i)$, and $m_2$ corresponds to an arithmetic mean of a matrix product $d \cdot d^T$ of ascertained gradients d across drawn pairs $(x_i, y_i)$.

Figure 14:
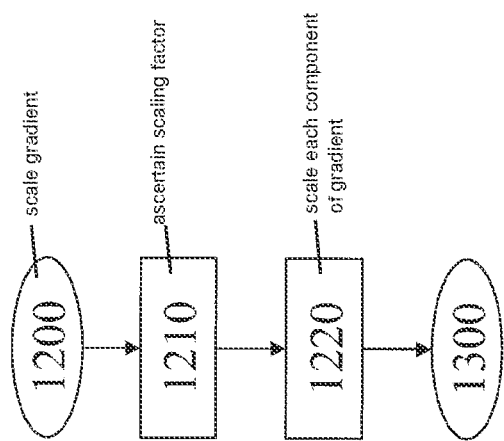
FIG. 14 shows a specific embodiment of a method for scaling the estimated gradient in a flowchart, in accordance with the present invention.

FIG. 14 shows a specific embodiment of the method for scaling gradient g in step 1200. In the following, each component of gradient g is designated by a pair (ι,l), ι∈{1, ..., k} designating a layer of appropriate parameters θ, and l∈{1, ..., dim($V_l$)} designates a numbering of appropriate parameter θ within the L-th layer. If the neural network, as illustrated in FIG. 10, is designed for processing multi-dimensional input data x with the aid of appropriate feature maps $z_ι$ in the ι-th layer, numbering l is advantageously established by the position of the feature in feature map $z_ι$, with which appropriate parameter θ is associated.

Now 1210, a scaling factor $\Omega_{ι,l}$ is ascertained for each component $g_{ι,l}$ of gradient g. For example, this scaling factor $\Omega_{ι,l}$ may be established by the size of receptive field rF of the feature of the feature map, corresponding to l, of the ι-th layer. Alternatively, scaling factor $\Omega_{ι,l}$ may also be established by a ratio of the resolutions, i.e., the number of features of the ι-th layer in relation to the input layer.

Thereafter 1220, each component $g_{ι,l}$ of gradient g is scaled by scaling factor ι, i.e., $$g_{ι,l} \leftarrow g_{ι,l} / \Omega_{ι,l}. \qquad (10)$$

If scaling factor $\Omega_{ι,l}$ is established by the size of receptive field rF, an over-fitting of parameters θ may be particularly effectively avoided. If scaling factor $\Omega_{ι,l}$ is established by the ratio of the resolutions, this is a particularly efficient estimation of the size of receptive field rF.

FIGS. 15a)-15c) illustrate specific embodiments of the method, which is carried out by scaling layer $S_4$.

Scaling layer $S_4$ is configured for achieving a projection of input signal x present at the input of scaling layer $S_4$ onto a sphere having radius ρ and center c. This is characterized by a first norm $N_1(y-c)$, which measures a distance of center c from output signal y present at the output of scaling layer $S_4$, and a second norm $N_2(x-y)$, which measures a distance of input signal x present at the input of scaling layer $S_4$ from output signal y present at the output of scaling layer $S_4$. In other words, output signal y present at the output of scaling layer $S_4$ solves the equation $$y = \arg\min_{N_1(y-c) \leq \rho} N_2(x-y) \qquad (11)$$

FIG. 15a) illustrates a particularly efficient first specific embodiment for the case in which first norm $N_1$ and second norm $N_2$ are identical. They are referred to in the following as $\|\cdot\|$.

Initially 2000, an input signal x present at the input of scaling layer $S_4$, a center parameter c, and a radius parameter ρ are provided.

Thereafter 2100, an output signal y present at the output of scaling layer $S_4$ is ascertained as $$y = c + \frac{\rho \cdot (x-c)}{\max(\rho, \|x-c\|)}. \qquad (12)$$

Thus ends this portion of the method.

FIGS. 15b) and 15c) illustrate specific embodiments of particularly advantageously selected combinations of first norm $N_1$ and second norm $N_2$.

FIG. 15b) illustrates a second specific embodiment for the case in which, in the condition (12) to be met, first norm $N_1(\bullet)$ is established by maximum norm $\|\cdot\|_\infty$ and second norm $N_2(\bullet)$ is established by 2-norm $\|\cdot\|_2$. This combination of norms is particularly efficiently calculated.

Initially 3000, similarly to step 2000, input signal x present at the input of scaling layer $S_4$, center parameter c, and radius parameter ρ are provided.

Thereafter 3100, components $y_i$ of output signal y present at the output of scaling layer $S_4$ are ascertained as $$y_i = \begin{cases} c_i + \rho & \text{if } x_i - c_i > \rho \\ c_i - \rho & \text{if } x_i - c_i < -\rho \\ x_i & \text{else} \end{cases} \qquad (13)$$

in which i designates the components.

This method is particularly computationally efficient. Thus ends this portion of the method.

FIG. 15c) illustrates a third specific embodiment for the case in which, in the condition (12) to be met, first norm $N_1(\bullet)$ is established by 1-norm $\|\cdot\|_1$ and second norm $N_2(\bullet)$ is established by 2-norm $\|\cdot\|_2$. Due to this combination of norms, in input signal x present at the input of scaling layer $S_4$, as many small components as possible are set to the value zero.

Initially 4000, similarly to step 2000, input signal x present at the input of scaling layer $S_4$, center parameter c, and radius parameter ρ are provided.

Thereafter 4100, a sign variable $\epsilon_i$ is ascertained as $$\epsilon_i = \begin{cases} +1 & \text{if } x_i \geq c_i \\ -1 & \text{if } x_i < c_i \end{cases} \qquad (14)$$

and components $x_i$ of input signal x present at the input of scaling layer $S_4$ are replaced by $$x_i \leftarrow \epsilon_i \cdot (x_i - c_i). \qquad (15)$$

An auxiliary parameter γ is initialized to the value zero.

Thereafter 4200, a set N is ascertained as $N = \{i | x_i > \gamma\}$ and a distance measure $D = \Sigma_{i \in N}(x_i - \gamma)$.

Thereafter 4300, a check is carried out to determine whether the inequality $$D > \rho \qquad (16)$$

has been satisfied.

If this is the case 4400, auxiliary parameter γ is replaced by $$\gamma \leftarrow \gamma + \frac{D - \rho}{|N|}, \qquad (17)$$

and the method jumps back to step 4200.

If the inequality (16) has not been satisfied 4500, components $y_i$ of output signal y present at the output of scaling layer $S_4$ are ascertained as $$y_i = c_i + \epsilon_i \cdot (x_i - \gamma)_+ \quad (18)$$

Here, the notation $(\bullet)_+$ means, as usual, $$(\xi)_+ = \begin{cases} \xi & \text{if } \xi > 0 \\ 0 & \text{else} \end{cases}. \quad (19)$$

Thus ends this portion of the method. This method corresponds to a Newton method and is particularly computationally efficient, in particular for the case in which several of the components of input signal x present at the input of scaling layer $S_4$ are important.

Figure 16:
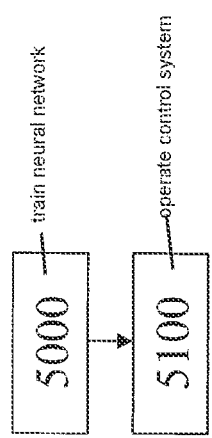
FIG. 16 shows a method for operating the trained neural network in a flowchart, in accordance with an example embodiment of the present invention.

FIG. 16 illustrates a specific embodiment of a method for operating neural network 60. Initially 5000, the neural network is trained with the aid of one of the described methods. Thereafter 5100, control system 40 is operated as described with the aid of neural network 60 trained in this manner. Thus ends the method.

It is understood that the neural network is not limited to feedforward neural networks, but rather that the present invention may be applied, in the same way, to any type of neural network, in particular recurrent networks, convolutional neural networks, autoencoders, Boltzmann machines, perceptrons, or capsule neural networks.

The term "computer" encompasses arbitrary devices for processing predefinable calculation specifications. These calculation specifications may be present in the form of software, or in the form of hardware, or also in a mixed form made up of software and hardware.

Moreover, it is understood that the methods may be completely implemented in software not only as described. They may also be implemented in hardware, or in a mixed form made up of software and hardware.

What is claimed is:

1. A method for classifying input signals, which were ascertained as a function of an output signal of a sensor, using a neural network, the method comprising:
   providing the neural network, the neural network including a scaling layer;
   mapping, by the scaling layer, an input signal ($z_4$) present at an input of the scaling layer onto an output signal ($z_5$) present at an output of the scaling layer in such a way that the mapping corresponds to a projection of the input signal ($z_4$) present at the input of the scaling layer onto a predefinable value range, parameters being predefinable, which characterize the mapping;
   wherein the predefinable value range is a ball, which is characterized by a predefinable center (c) of the ball and a predefinable radius (ρ) of the ball;
   wherein, in a training phase, the predefinable center (c) of the ball and the predefinable radius (ρ) of the ball are adapted as a function of training the neural network, an adaptation of the predefinable center (c) of the ball and the predefinable radius (ρ) of the ball occurring during the training as a function of an output signal (y) of the neural network when an input signal (x) of the neural network is supplied and as a function of an associated desired output signal, and the adaptation of the predefinable center (c) of the ball and the predefinable radius (ρ) of the ball occurring as a function of an ascertained gradient which is dependent on the output signal (y) of the neural network and the associated desired output signal.

2. The method as recited in claim 1, wherein the mapping is established by the following equation $z_5 = \operatorname{argmin}_{N_1(z_5 - c) \leq \rho} N_2(z_4 - z_5)$ including a first norm ($N_1$) and a second norm ($N_2$).

3. The method as recited in claim 2, wherein the first norm ($N_1$) and the second norm ($N_2$) are selected to be identical.

4. The method as recited in claim 2, wherein the first norm ($N_1$) is an $L^\infty$ norm.

5. The method as recited in claim 4, wherein the second norm ($N_2$) is an $L^2$ norm.

6. The method as recited in claim 2, wherein the first norm ($N_1$) is an $L^1$ norm.

7. The method as recited in claim 2, wherein the equation is solved using a deterministic Newton method.

8. The method as recited in claim 1, wherein the mapping is established by the following equation $$y = c + \frac{\rho \cdot (x - c)}{\max(\rho_x \| x - c \|)}.$$

9. A method for providing an activation signal for activating an actuator, the method comprising:
   ascertaining the activation signal as a function of an output signal of a neural network, wherein the neural network includes a scaling layer, the scaling layer mapping an input signal ($z_4$) present at an input of the scaling layer onto an output signal ($z_5$) present at an output of the scaling layer in such a way that the mapping corresponds to a projection of the input signal ($z_4$) present at the input of the scaling layer onto a predefinable value range, parameters ρ, c being predefinable, which characterize the mapping;
   wherein the predefinable value range is a ball, which is characterized by a predefinable center (c) of the ball and a predefinable radius (ρ) of the ball;
   wherein, in a training phase, the predefinable center (c) of the ball and the predefinable radius (ρ) of the ball are adapted as a function of training the neural network, an adaptation of the predefinable center (c) of the ball and the predefinable radius (ρ) of the ball occurring during the training as a function of an output signal (y) of the neural network when an input signal (x) of the neural network is supplied and as a function of an associated desired output signal, and the adaptation of the predefinable center (c) of the ball and the predefinable radius (ρ) of the ball occurring as a function of an ascertained gradient which is dependent on the output signal (y) of the neural network and the associated desired output signal.

10. The method as recited in claim 9, wherein an actuator is activated as a function of the activation signal.

11. The method as recited in claim 9, wherein the mapping is established by the following equation $z_5 = \operatorname{argmin}_{N_1(z_5 - c) \leq \rho} N_2(z_4 - z_5)$ including a first norm ($N_1$) and a second norm ($N_2$).

12. The method as recited in claim 9, wherein the mapping is established by the following equation $$y = c + \frac{\rho \cdot (x - c)}{\max(\rho_x \| x - c \|)}.$$

13. A non-transitory machine-readable memory medium on which is stored a computer program for providing an activation signal for activating an actuator, the computer program, when executed by a computer, causing the computer to perform:

ascertaining the activation signal as a function of an output signal of a neural network, wherein the neural network includes a scaling layer, the scaling layer mapping an input signal ($z_4$) present at an input of the scaling layer onto an output signal ($z_5$) present at an output of the scaling layer in such a way that the mapping corresponds to a projection of the input signal ($z_4$) present at the input of the scaling layer onto a predefinable value range, parameters $\rho$, c being predefinable, which characterize the mapping;

wherein the predefinable value range is a ball, which is characterized by a predefinable center (c) of the ball and a predefinable radius ($\rho$) of the ball;

wherein, in a training phase, the predefinable center (c) of the ball and the predefinable radius ($\rho$) of the ball are adapted as a function of training the neural network, an adaptation of the predefinable center (c) of the ball and the predefinable radius ($\rho$) of the ball occurring during the training as a function of an output signal (y) of the neural network when an input signal (x) of the neural network is supplied and as a function of an associated desired output signal, and the adaptation of the predefinable center (c) of the ball and the predefinable radius ($\rho$) of the ball occurring as a function of an ascertained gradient which is dependent on the output signal (y) of the neural network and the associated desired output signal.

14. The non-transitory machine-readable memory medium as recited in claim 13, wherein the mapping is established by the following equation $z_5 = \mathrm{argmin}_{N_1(z_5-c) \leq \rho} N_2(z_4 - z_5)$ including a first norm ($N_1$) and a second norm ($N_2$).

15. The non-transitory machine-readable memory medium as recited in claim 13, wherein the mapping is established by the following equation $$y = c + \frac{\rho \cdot (x - c)}{\max(\rho_x, \|x - c\|)}.$$

16. An actuator control system, comprising at least one processor, configured to provide an activation signal for activating an actuator, the actuator control system configured to:

ascertain the activation signal as a function of an output signal of a neural network, wherein the neural network includes a scaling layer, the scaling layer mapping an input signal ($z_4$) present at an input of the scaling layer onto an output signal ($z_5$) present at an output of the scaling layer in such a way that the mapping corresponds to a projection of the input signal ($z_4$) present at the input of the scaling layer onto a predefinable value range, parameters $\rho$, c being predefinable, which characterize the mapping;

wherein the predefinable value range is a ball, which is characterized by a predefinable center (c) of the ball and a predefinable radius ($\rho$) of the ball;

wherein, in a training phase, the predefinable center (c) of the ball and the predefinable radius ($\rho$) of the ball are adapted as a function of training the neural network, an adaptation of the predefinable center (c) of the ball and the predefinable radius ($\rho$) of the ball occurring during the training as a function of an output signal (y) of the neural network when an input signal (x) of the neural network is supplied and as a function of an associated desired output signal, and the adaptation of the predefinable center (c) of the ball and the predefinable radius ($\rho$) of the ball occurring as a function of an ascertained gradient which is dependent on the output signal (y) of the neural network and the associated desired output signal.

17. The actuator control system as recited in claim 16, wherein the mapping is established by the following equation $z_5 = \mathrm{argmin}_{N_1(z_5-c) \leq \rho} N_2(z_4 - z_5)$ including a first norm ($N_1$) and a second norm ($N_2$).

18. The actuator control system as recited in claim 16, wherein the mapping is established by the following equation $$y = c + \frac{\rho \cdot (x - c)}{\max(\rho_x, \|x - c\|)}.$$

* * * * *